United States Patent [19]

Sommer

[11] Patent Number: 4,552,255
[45] Date of Patent: Nov. 12, 1985

[54] MULTIPLE SPEED DRIVE

[75] Inventor: Gordon M. Sommer, Boca Raton, Fla.

[73] Assignee: Sommer Company, Warren, Mich.

[21] Appl. No.: 521,250

[22] Filed: Aug. 8, 1983

[51] Int. Cl.$^4$ .............................................. F16D 67/04
[52] U.S. Cl. ................................ 192/18 A; 192/87.19; 74/665 B
[58] Field of Search ............... 192/87.19, 87.18, 87.17, 192/87.16, 87.15, 87.14, 18 A, 18 R; 74/665 B, 664, 356, 359

[56] References Cited

U.S. PATENT DOCUMENTS

| | | | |
|---|---|---|---|
| 3,550,735 | 12/1970 | Olsen | 192/87.19 |
| 3,696,898 | 10/1972 | Sommer | 192/18 A |
| 3,921,770 | 11/1975 | Daab et al. | 192/12 D |
| 4,106,606 | 8/1978 | Cory | 192/113 B |
| 4,183,425 | 1/1980 | Sommer | 192/18 A |
| 4,312,243 | 1/1982 | Gott et al. | 192/87.19 |
| 4,317,512 | 3/1982 | Sato | 192/18 A |

FOREIGN PATENT DOCUMENTS 2032022  4/1980  United Kingdom ............. 192/87.17

Primary Examiner—George H. Krizmanich
Attorney, Agent, or Firm—Harness, Dickey & Pierce

[57] ABSTRACT

A multiple speed drive unit that has a first input shaft driven by a motor, a plurality of secondary input shafts driven by the first input shaft, an output shaft, an oil shear brake for the output shaft, an oil shear clutch for each of the secondary input shafts adapted to be actuated to transmit rotational energy between a selected secondary input shaft and the output shaft, and a control for selectively engaging a selected clutch or brake.

13 Claims, 3 Drawing Figures

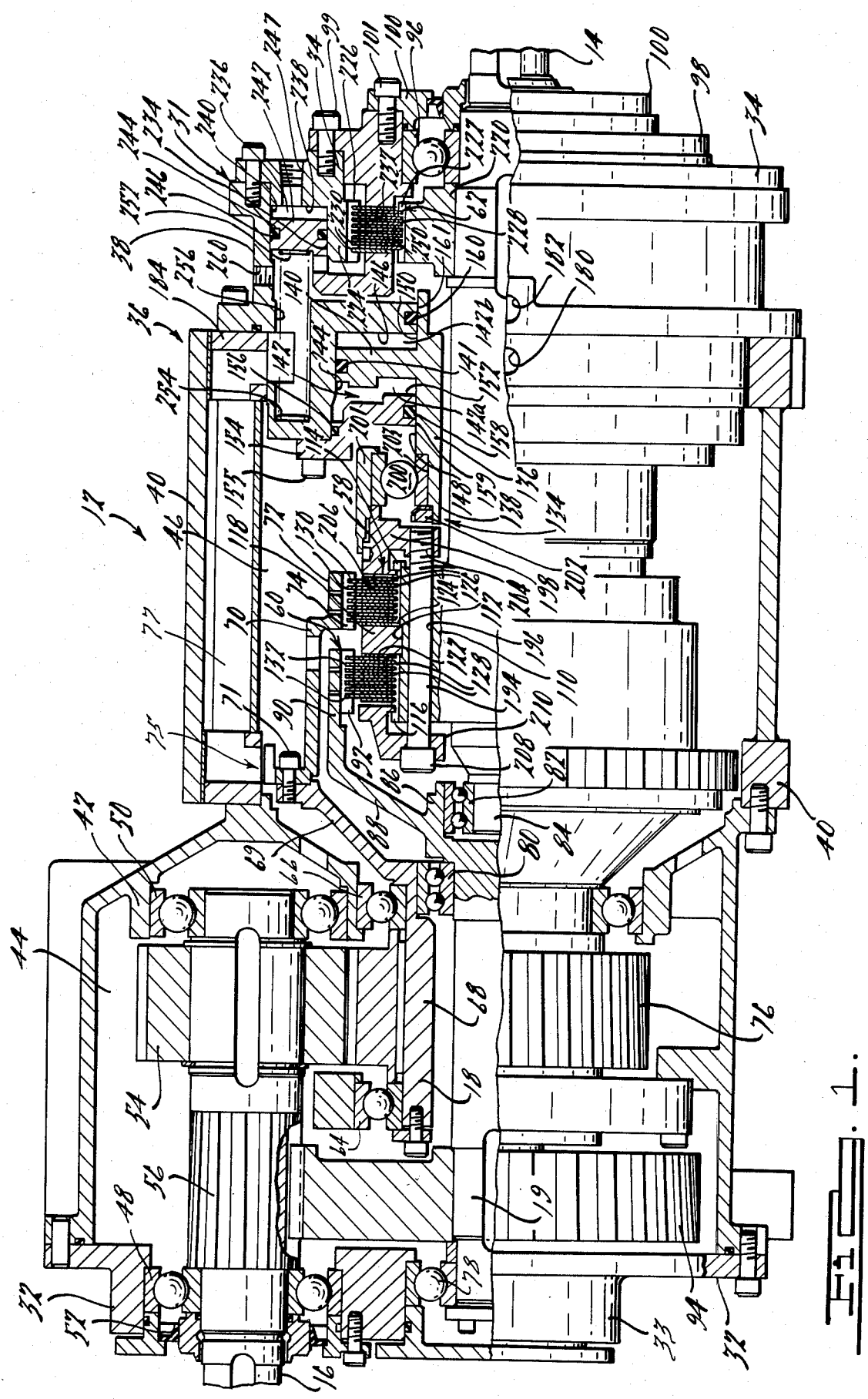

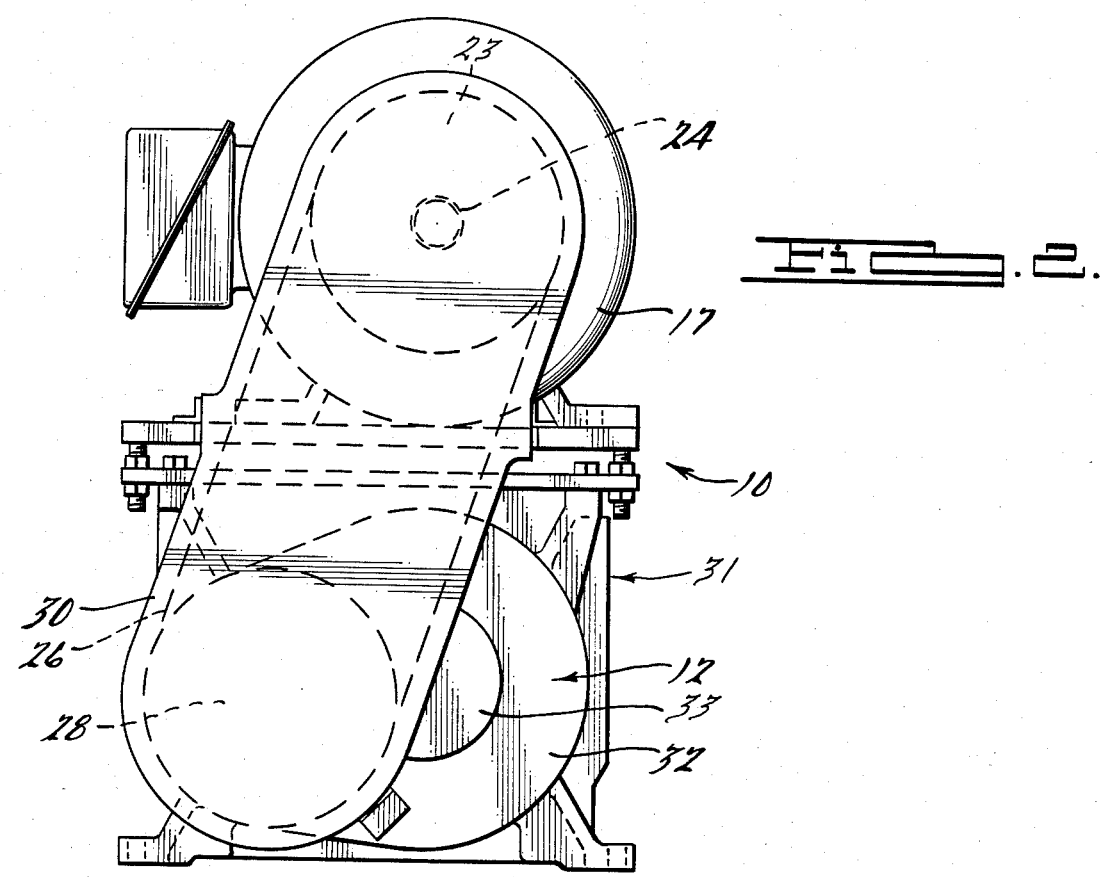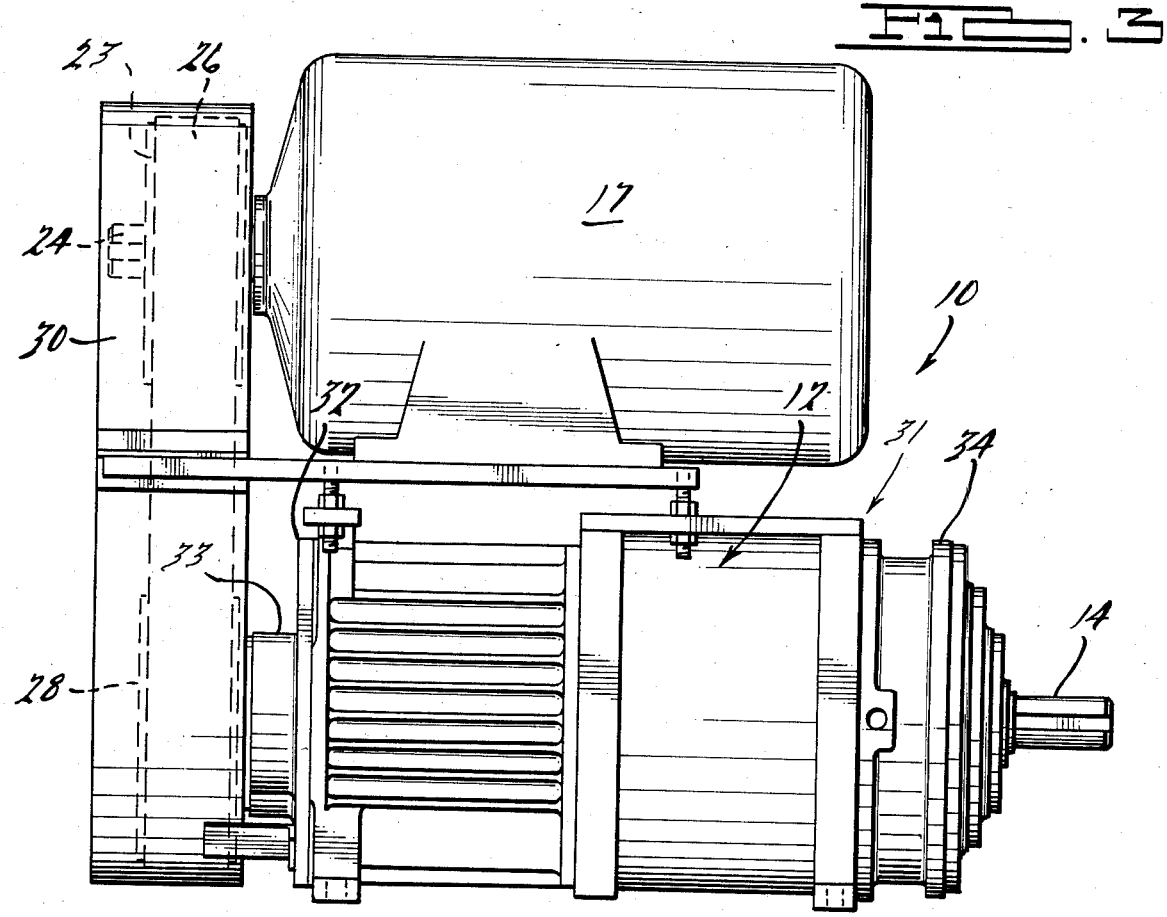

MULTIPLE SPEED DRIVE

BACKGROUND AND SUMMARY OF THE INVENTION

The present invention relates to drive units for machine applications, such as a punch press or the like, and in particular relates to a multiple speed drive mechanism controlled by a clutch/brake unit of the oil shear type.

Prior art oil shear types of clutch/brake units are definitely described in applicant's prior U.S. Pat. No. 3,696,898, issued Oct. 10, 1982. In many situations, however, it is desireable to provide variable speeds or variable types of movement (such as constant speed versus inching) to a driven mechanism without controlling a motor directly due to a desire to limit any significant period or transient effects. Other considerations may include the lack of ability of a particular motor to provide various speeds or variable types of movement.

The present invention provides the above with the additional advantages prevalent from the utilization of an oil submerged, oil shear interfaced plate and disc construction, such as minimal amount of wear on the plates and discs due to the fact that the torque transmitting function is achieved by the shearing of oil interjacent the plates and discs, low drive inertia, effective oil cooling medium, and compact size. All of the above is provided in the present invention along with a further advantage that the clutch operations are mechanically interlocked and the clutch and brake operations interfaced to prevent damage to the unit due to improper timing.

Other objects and advantages of the present invention will become apparent from the following detailed description taken in conjunction with the accompanying drawings.

BRIEF DESCRIPTION OF THE DRAWINGS

FIG. 1 is a longitudinal cross-sectional view of the multiple speed drive unit of the present invention;

FIG. 2 is an elevated end view of a device of the present invention of FIG. 1 with two drive motors operably secured thereto;

FIG. 3 is an elevated side view of the device of FIG. 2.

DETAILED DESCRIPTION OF THE PREFERRED EMBODIMENTS

Referring to FIGS. 1, 2 and 3, a multiple speed drive 10 is shown in the form of a two-speed drive unit 12 having a driven output shaft 14 which is suitably connected to a machine such as a punch press or the like, a driving primary input shaft 16 suitably connected to a motor 17, and two secondary input shafts 18 and 19 (FIG. 1) operably associated with and driven by the primary input shaft 16. In the illustrated embodiment, the motor 17 is a 25 horsepower, 1800 r.p.m., electric motor mounted to the unit 12 by suitable bolt fasteners. A drive pulley 23 is secured to the output shaft 24 of the motor 17 and drives a V-belt 26 which in turn drives a second pulley 28 operably secured to the first input shaft 16 of the unit 12. A suitable protective cover 28 mounted on the unit 12 is disposed over the pulleys 23 and 28 and the belt 26. It will be recogniaed by a person of ordinary skill in the art that the size of the various motors used will vary with the applications for which they are used.

The drive unit 12 includes a housing 31 comprised of two end walls 32 and 34 and a central housing wall assembly 36, comprising annular walls 38 and 40, disposed concentrically about the centerline of the unit formed by the output shaft 14, and wall 42 which is disposed primarily about the input shafts 16, 18, and 19 of the units 12 and separates the housing assembly 36 into two distinct chambers 44 and 46.

The first chamber 44 houses the first input shaft 16 supported by suitable bearings 48 and 50 and seals 52. Disposed on the first input shaft 16 at two intermediate locations within the chamber 44 are first pinion gear 54 and second pinion gear 56. One of the gears 54 or 56 may be a spline gear, as shown at gear 56.

The second chamber 46 houses the secondary input shafts 18 and 19, a first clutch assembly 58, a second clutch assembly 60, and a brake assembly 62, along with suitable support and control mechanisms. The first secondary or outer input shaft 18 is rotatably supported by a plurality of anti-friction bearing assemblies 64 and 66 which are disposed within the annular wall 42, but in the second chamber 46 portion of the housing assembly 36. This first secondary input shaft 18 comprises an annular axially extending section 68, an intermediate conical portion 69 integral with the annular section 68, an enlarged diameter annular section 70 suitably fastened to the intermediate portion 69 by bolts 71, and an extended annular supporting section 72 integral with the enlarged diameter annular section 70. The extended section 72 has a plurality of radially inwardly extending drive lugs 74 disposed at circumferentially spaced apart locations along the inner surface thereof. A pumping mechanism 75 is included at the radially outer portion of the section 70, feeding into oil passageway 77. A gear 76 is secured to outer periphery of the annular axially extending section 68 of the first secondary input shaft 18 and engages and is driven by first pinion gear 54 on the primary input shaft 16 whereby movement of the primary shaft 16 will rotate the secondary shaft 18 at the ratio of the gears times the speed of rotation of the primary shaft 16.

The second secondary or inner input shaft 19 is rotatably supported by a plurality of concentric anti-friction bearing assemblies 78, 80 and 82. Bearing assemblies 78 is disposed within endwall 32 at an extended portion 33 thereof and bearing assembly 80 is disposed between the outer surface of the second secondary input shaft 19 and the inner surface of the annular axially extending portion 68 of the first secondary input shaft 18. The third bearing assembly 82 is disposed between the outer surface of one end 84 of the output shaft 14 and the inner surface of an axially extending annular portion 86 of the second secondary input shaft 19. The shaft 19 further comprises a conical section 88 integral with said annular portion 86 and a second extended annular supporting section 90 integral with the conical section. The second annular section 90 includes a plurality of radially inwardly extending drive lugs 92 disposed at circumferentially spaced apart locations along the inner surface thereof. A gear 94 is secured to the shaft 19 in a position to engage and be driven by the second pinion gear 56 on the primary input shaft 16 whereby movement of the primary shaft 16 will also rotate the secondary shaft 19 at the ratio of the gears times the speed of that primary shaft 16.

The output shaft 14 is rotatably supported by two bearing assemblies, the first 82 as described above and a second 96 supported within end wall 34 between intermediate end wall 98 secured to end wall 34 by bolts 99 and cap 100 secured to intermediate end wall 98 by bolts 101.

The output shaft 14 is formed with an enlarged diameter section 110 at a position substantially intermediate the end walls 32 and 34 of the unit 12. The section 110 is provided with a radially inwardly extending recess 112 substantially midway between the opposite ends thereof, with the remaining portions of the outer surface of the section 110 on the opposite sides of the recess 112 being formed with external spline formations 114 and 116. A central split ring member 118 is adapted to be snapped into engagement with the recess 112 of the shaft section 110, the member 118 defining longitudinally spaced, radially extending, generally parallel sides 122 and 124.

A first series of clutch friction discs, generally designated 126, having internal formations complementary to the formations 114, are splined on the formations 114, and a second series of clutch friction discs, generally designated 128, identical to the discs 126, having internal formations complementary to the formations 116 are disposed in splined engagement with the formations 116 on the opposite side of the ring member 118 from the discs 126, as illustrated in FIG. 1.

A series of friction clutch plate members, generally designated 130, are each provided with a plurality of circumferentially spaced, radially inwardly extending notches adapted for keyed engagement with the plurality of longitudinally extending, circumferentially spaced drive lugs 74 that are mounted upon the supporting section 72 of the secondary input shaft 18. As illustrated in FIG. 1, the plate members 130 are each internally bored, with the inner peripheral edges thereof being interposed between the outer peripheral edges of the clutch friction discs 126. Similarly, a second series of friction clutch plate members, generally designated 132, are each provided with a plurality of, but preferably four, keyed notches adapted for keyed engagement with a plurality of corresponding drive lugs 92 which are mounted on the supporting section 90 of secondary input shaft 19. The second clutch plate members 132 are each centrally stored, with the inner peripheral edges thereof being interposed between the outerperipheral edges of the series of second clutch friction discs 128, as shown in FIG. 1.

The two clutches 58, 60 are alternately actuated by a pneumatically actuated piston assembly 134. The piston assembly 134 comprises a generally cylindrical sleeve section 136 defining a central, axially extending bore 138 which is arranged coaxially of the axis of the output shaft 14 through which bore 138 of the shaft 14 extends. The piston assembly 136 also comprises a radially outwardly extending annular section 140, the radially outermost portion of which is provided with suitable O-ring sealing means 141.

The outwardly extending section 140 is disposed in an annular chamber 142 formed on two sides by surfaces 144 and 146 of end wall 38, one side by external cylindrical surfaces 148 and 150 of the sleeve 136, and on the remaining side by surface 152 of annular wall portion 154 secured to end wall 38 at circumferentially spaced apart locations by bolts 155 and having a suitable O-ring seal 156 disposed between the wall portion 154 and end wall 38. The sealing means 141 of the radially outwardly extending section 140 sealingly engages surface 144 of the chamber 142. O-ring sealing means 158 and 160 is also provided at the radially inner periphery 159 of the annular wall portion 154 and the radially inner periphery 161 of the end wall 38, respectively, to sealingly engage surfaces 148 and 150, respectively, of the sleeve 136 and totally seal the chamber 142 into two sections 142a and 142b.

The piston assembly 134 is adapted to be reciprocally mounted within the chamber 142 and be biased axially in response to differential forces exerted against opposite sides of the Section 140.

The chamber 142 is communicable through air passages 180 and 182 formed in the housing wall 182 and end wall 38 respectively, each with a suitable fitting means for communicating pressurized air from air conduits (not shown). The location of the passages 180 and 182 is preferably one on each side of the unit 12, in which case they may both be passed through the end wall 38. It will be seen that when pressurized air is communicated via a conduit and passage 180 to the interior of the chamber 142a, and is at a higher pressure than the air pressure in chamber 142b, the entire piston member 136 will be biased longitudinally toward the right in FIG. 1. Similarly, at such times as the air pressure via passage 182 into the diameter 142b increases the air pressure there relative to the air pressure in chamber 142a, the piston member 156 will be biased toward the left in FIG. 1.

Mechanical interlock means for either simultaneously compressing the first clutch plate members 130 and the friction discs 126 together and relieving the frictional engagement between the second clutch plate members 132 and the clutch friction discs 128, or alternatively, for simultaneously relieving the frictional engagement between the first clutch plate members 130 and friction discs 126 and compressing the second clutch plate members 132 and the clutch friction discs 128 together. In response to reciprocable movement of the piston member 134, mechanical interlocking is achieved through the provision of a series longitudinally extending, circumferentially spaced screws, generally designated 194, reciprocally or slidably disposed one within each of a plurality of longitudinally extending, circumferentially spaced bores, generally designated 196, formed in the enlarged diameter section 110 of the output shaft 14. The right ends of the plurality of screws 194, as viewed in FIG. 1, are externally threaded and are adapted to be fixedly secured to an annular first clutch actuating member 198 which is operatively connected to the piston sleeve 136 via an anti-friction bearing 200, an upper annular bearing restraint 201 securing the bearing 200 to the member 198, and a snap ring 202 securing the bearing 200 to the piston sleeve 136 when the bearing 200 is properly disposed in a recess 203. Toard this end, the member 198 is formed with a series of longitudinally extending, circumferentially spaced bores 204 which are aligned with the bores 196. The clutch actuating member 198 defines a generally radially extending face 206 which is adapted to cooperate with the side 124 of the central ring 118 in clampingly engaging the first clutch plate members 130 and first clutch friction discs 126 together in a manner hereinafter to be described.

The ends of the screws 194 opposite that which are connected to the member 198, i.e., the left ends of the screws 194 as viewed in FIG. 1, are formed with head portions 208 and are adapted to be engaged with a second clutch actuator 210, which is operatively connected via the screws 194 and the first clutch actuating member 198 with the piston sleeve 136. Spacer rods may also be used between the clutch actuators 198 and 210 as described in applicant's U.S. Pat. No. 3,696,898.

The brake assembly 62 is disposed between the output shaft 14 and the housing 31 and the end walls 34 and 38 thereof. A sleeve 220 is secured to the output shaft 14 to be rotatable with that shaft, with a series of external spline formations 222 disposed at circumferentially spaced apart locations at the radially outer periphery of the sleeve 220. End wall 34 has an annular support section 224 extending interiorly from the wall 34 with a plurality of splines 226 disposed at circumferentially spaced locations along the inner surface thereof.

A series of brake friction discs, generally designated 228, having internal formations complementary to the formations 222, are splined on the formations 222. A series of friction brake plate members, generally designated 230, are each provided with a plurality of circumferentially spaced, radially inwardly extending notches adapted for keyed engagement with the plurality of longitudinally extending, circumferentially spaced splines 226 that are disposed along the inner surface of the support section 224 of the end wall 34. As illustrated in FIG. 1, the plate members 230 are each internally bored, with the inner peripheral edges thereof being interposed between the outer peripheral edges of the brake friction discs 228, and abut on one side as a group with an annular face 232 of intermediate end wall 98.

The radially outer surface 234 of the annular support section 224 of end wall 34 comprises one wall of an annular piston chamber 236 the other walls of which are surface 238 of end wall 34 and the radially inner surface 240 of end wall 38. A complementary shaped piston head 242 moves within the chamber 236 with suitable O-ring sealing means 244 and 246 sealingly engaging the inner and outer peripheries of the piston head 242 which surfaces 234 and 240, respectively. An air passage 247 communicates the chamber 236, through suitable fitting and conduit means, with a source of pressurized air and a mechanism for the control of said pressurized air to the chamber 46.

The piston head 242 is integral with an annular arm 248, having a C-shaped cross-section in FIG. 1. The arm 248 has one face 250 which is capable of contacting the stack of brake plates 230 and discs 228 and a second face 252 which is engageable with a plurality of biasing springs 254 disposed in a plurality of bores 256 in end wall 38.

The oil pump 22 feeds cooling and lubricating oil to all of the various parts of the unit 12 in a conventional manner, such as that described in applicant's U.S. Pat. No. 3,696,898, including the brake assembly 62 via oil passage 260 and suitable conduits (not shown). The pump 22 will be operational whenever the motor 17 drives the input shaft 16.

In operation, the motor 17 can run at a selected speed to drive the primary input shaft 16. Due to the gear ratios between the gears 54 and 56 on the input shaft 16 and the gears 76 and 94, respectively, disposed on the outer 18 and inner 19 input shafts, the outer 18 and inner 19 input shafts rotate at different speeds, preferably at a higher speed (inner shaft 19) and a lower speed (outer shaft 18).

Valving means (not shown) is included to feed air to passages 180 and 182 via separate conduits from the valving means. A typical control valve between a source of pressurized air and the passages 180 and 182 will have a first position feeding pressurized air to passage 180 and venting passage 182 to atmosphere, a second position feeding pressurized air to passage 182 and venting passage 180 to atmosphere and a third position which supplies air of equal pressure to both passages. Feeding equally pressurized air to both passages would be preferred to overcome any transient behavior of the piston assembly 134, but it is envisioned that a bleed to atmosphere may also perform the release of both clutches 58 and 60.

A control valve (not shown) is also provided to supply pressurized air to air passage 247 to disengage the brake 62. This brake control valve has a first position venting to atmosphere to permit the brake 62 to be engaged due to the bias of the springs 254 and a second position where the valve provides pressurized air to the passage 247 to de-activate the brake 62. It is contemplated that the control of the brake 62 and clutches 58 and 60 can be interrelated such that pressurized air is provided to the brake passage 247 to disengage the brake 62 when the clutch control valve is in its first or second positions and no pressurized air is fed to the brake passage 247 (so that the brake 62 is in an engaged position) when the clutch control valve is in its third position.

Thus the actuation of either clutch 58 or clutch 60 will provide a different speed of rotation of the output shaft 14 for the same rotational speed of input by the motor to the input shaft 16. The gear ratios will determine the speed. If inching is desired, a gear with toothed portions having circumferentially spaced non-toothed portions may be used as a pinion on the input shaft 16.

It is further anticipated that three of more shafts may be concentrically disposed in a manner similar to the inner 19 and outer 18 shafts described above with similar clutch plate and disc mechanisms to interconnect the various input shafts selectively with the output shaft 14 of the unit.

Thus, there is disclosed in the above description and in the drawings a multiple speed drive unit which fully and effectively accomplishes the objectives thereof. Any dimensions set forth in the above specification are merely representative and are not meant to be limiting on the scope of the invention. It will be apparent that variations and modifications of the disclosed embodiments may be made without department from the principles of the invention or the scope of the appended claims.

I claim:

1. A multiple speed drive unit comprising: a housing defining a central cavity between opposite longitudinally spaced end walls, a main shaft extending coaxially through said opposite spaced end walls and comprising first and second coaxially arranged shaft sections; said first shaft section further comprising inner and outer shaft sections, first and second series of radially disposed clutch plates spaced axially from one another and mounted in said cavity for rotation with said inner and outer shaft sections respectively of said first shaft section; a series of radially disposed brake plates spaced axially from both series of said clutch plates and non-rotatably disposed in said cavity; a series of friction discs mounted on said second shaft section for rotation therewith and adapted for selective frictional engagement with said clutch and brake plates; first and second clutch actuating members located on axially opposite sides of selective of said friction discs and movable axially of said shaft sections, with movement thereof in one direction serving simultaneously to frictionally engage said first series of clutch plates with selected of said friction discs and to release selected of the remaining friction discs from frictional engagement with said second series of clutch plates and with movement thereof in the other direction serving simultaneously to release said first series of clutch plates from said frictional engagement with selected of said friction discs and to frictionally engage said second series of clutch plates with selected of said remaining friction discs; a non-rotatable piston member disposed in said housing coaxial of said main shaft and movable between first and second positions for effecting axial movement of said actuating member; first pressure applying means including a pressurized fluid acting against one side of said piston member for urging said piston member toward one of said positions of clutch engagement; second pressure applying means including a pressurized fluid acting against the other side of said piston member for urging said piston member toward the other of said positions of clutch plate engagement; means for equalizing the pressures applied to said first and second pressure applying means to urge said piston to an intermediate position at which neither series of clutch plates is engaged with said friction discs; a brake actuating member axially spaced from said clutch actuating members and movable axially of said main shaft with movement thereof in one direction serving to frictionally engage said brake plates with selected of said friction discs mounted on said second shaft section and movement thereof in the opposite direction serving to release said brake plates from engagement with selected of said friction discs; a second non-rotatable piston member disposed in said housing coaxial of said shaft and movable between first and second positions for effecting axial movement of said brake actuating member; spring means for urging said second piston member toward one of said brake actuating member positions; and third pressure applying means including a pressurized fluid acting against one side of said second piston member for urging said piston member toward the other of said brake actuating member positions against the bias of said spring means.

2. A multiple speed drive unit in accordance with claim 1, further comprising means for driving said inner and outer shaft sections.

3. A multiple speed drive unit in accordance with claim 2, wherein said driving means comprises a drive motor, a drive shaft disposed in said housing parallel to said main shaft, and gear means operably associated with said drive shaft for driving said inner and outer shaft sections.

4. A multiple speed drive unit in accordance with claim 3, wherein said gear means comprises two pinion gears of different diameters mounted on said drive shaft and a gear operably associated with each of said inner and outer shafts, wherein said inner shaft gear is cooperable with the first of said pinion gears to provide a first speed of rotation of said inner shaft and said outer shaft gear is cooperable with the second of said pinion gears to provide a second different speed of rotation of said outer shaft.

5. A drive unit in accordance with claim 1, wherein the centerline of rotation of said first input shaft means is parallel to and spaced apart from the centerline of rotation of said second input shaft means, said third input shaft means and said output shaft means.

6. A drive unit in accordance with claim 1, wherein said second input shaft means, said third input shaft means, and said output shaft means all have the identical axis of rotation.

7. A multiple speed drive unit comprising:
a motor;
a housing;
a first input shaft means disposed at least in part within said housing and driven by said motor;
second and third input shaft means disposed at least in part in said housing and driven by said first input shaft means;
output shaft means disposed at least in part within said housing for driving a machine, wherein said output shaft means, said second input shaft means and said third input shaft means all have an identical axis of rotation; and
first clutch means for operably engaging said second input shaft means with said output shaft means and second clutch means for operably engaging said third input shaft means with said output shaft means, said first and second clutch means each comprising a series of radially disposed plates spaced axially from one another and mounted in said housing for rotation with one of said first or second shaft means, and a series of radially disposed friction discs spaced axially from one another and mounted in said housing for rotation with said output shaft, wherein said clutch plates and said friction discs are adapted to be actuated so as to cooperate to transmit rotational energy selectively between one of said second or third input shaft means and said output shaft means and wherein said second and third input shaft means are radially displaced from said output shaft means at the point at which at least one of said clutch means is engaged.

8. A drive unit in accordance with claim 7, further comprising means disposed within said housing for braking said output shaft means.

9. A drive unit in accordance with claim 8, wherein said braking means comprises a series of radially disposed plates spaced axially from one another and mounted within said housing to said housing, a series of radially disposed discs spaced axially from one another and mounted in said housing for rotation with said output shaft means for disposing a lubricating fluid between said plates and discs, and means for operably associating said plates, discs, and oil to brake said output shaft means.

10. A drive unit in accordance with claim 9, farther comprising means for interrelating brake engagement with clutch disengagement and brake disengagement with clutch engagement.

11. A drive unit in accordance with claim 7, further comprising mechanical interlock means which releases said first clutch means when said second clutch means is engaged and releases said second clutch means when said first clutch means is engaged.

12. A multiple speed drive unit comprising a housing, drive means disposed within said housing, a plurality of each comprising a clutch disc and plate stack means disposed in said housing, said clutch discs being driven by said drive means, actuator means for engagement of the discs and plates of each stack independently of any other clutch disc and plate stack, all of said driven means being rotatably disposed on the same axis of rotation, output shaft means, means for braking said output shaft, and means for selectively engaging one of said driven means or said braking means with said output shaft.

13. A multiple speed drive unit comprising:
a motor;
a housing;
a first input shaft means disposed at least in part within said housing and driven by said motor;
second and third input shaft means disposed at least in part in said housing and driven by said first input shaft means;
output shaft means rotatable about one axis of rotation disposed at least in part within said housing in part outside said housing for driving a machine and also disposed at least in part within said second and third input shaft means; and
first clutch means for operably engaging said second input shaft means with said output shaft means and second clutch means for operably engaging said third input shaft means with said output shaft means, said first and second clutch means each comprising a series of radially disposed plates spaced axially from one another and mounted in said housing for rotation with one of said first or second shaft means, and a series of radially disposed friction discs spaced axially from one another and mounted in said housing for rotation with said output shaft, wherein said clutch plates and said friction discs are adapted to be actuated so as to cooperate to transmit rotational energy selectively between one of said second or third input shaft means and said output shaft means and wherein said second input shaft means, said third input shaft means, and said output shaft means all have the identical axis of rotation.

* * * * *

UNITED STATES PATENT AND TRADEMARK OFFICE
CERTIFICATE OF CORRECTION

PATENT NO. : 4,552,255
DATED : November 12, 1985
INVENTOR(S) : Gordon M. Sommer

It is certified that error appears in the above-identified patent and that said Letters Patent is hereby corrected as shown below:

Column 1, line 14; "desireable" should be --desirable--

Column 1, line 19; following "significant" insert --transition--

Column 1, line 67; "recogniaed" should be --recognized--

Column 3, line 47; "outerperipheral" should be --outer peripheral--

Column 4, line 55; "Toard" should be --Toward--

Column 5, line 37; "which" should be --with--

Column 6, line 34; "of" should be --or--

Column 6, line 47; "department" should be --departing--

Column 8, line 51; "farther" should be --further--

Signed and Sealed this

Fourth Day of March 1986

[SEAL]

Attest:

DONALD J. QUIGG

Attesting Officer

Commissioner of Patents and Trademarks